(12) United States Patent
Gordon

(10) Patent No.: US 7,775,482 B2
(45) Date of Patent: Aug. 17, 2010

(54) AIRCRAFT ICING SENSOR

(75) Inventor: Grant A. Gordon, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 337 days.

(21) Appl. No.: 12/105,951

(22) Filed: Apr. 18, 2008

(65) Prior Publication Data

US 2009/0261811 A1 Oct. 22, 2009

(51) Int. Cl.
*B64D 15/20* (2006.01)
*G08B 19/02* (2006.01)

(52) U.S. Cl. .................. 244/134 F; 340/580; 340/581; 340/583; 73/583; 244/134 E; 324/634

(58) Field of Classification Search .................. 324/634, 324/643; 73/583, 599, 600; 340/580, 581, 340/583; 244/134 E, 134 F
See application file for complete search history.

(56) References Cited

U.S. PATENT DOCUMENTS

| | | | | |
|---|---|---|---|---|
| 4,054,255 A | * | 10/1977 | Magenheim | ............. 244/134 F |
| 4,075,555 A | * | 2/1978 | Wight et al. | ................. 324/644 |
| 4,649,713 A | * | 3/1987 | Bezek | .......................... 62/140 |
| 4,688,185 A | * | 8/1987 | Magenheim et al. | ........ 702/172 |
| 5,005,015 A | * | 4/1991 | Dehn et al. | .................. 340/962 |
| 5,014,042 A | | 5/1991 | Michoud et al. | |
| 5,772,153 A | * | 6/1998 | Abaunza et al. | ........... 244/134 F |
| 6,010,095 A | * | 1/2000 | Hackmeister | ............. 244/134 F |
| 6,237,874 B1 | | 5/2001 | Rutherford et al. | |
| 6,281,688 B1 | * | 8/2001 | Yankielun | .................... 324/643 |
| 6,995,572 B2 | * | 2/2006 | Arndt et al. | .................. 324/639 |
| 7,026,943 B2 | * | 4/2006 | Knowles et al. | ............. 340/582 |
| 7,373,272 B2 | * | 5/2008 | Gualtieri | ...................... 702/150 |
| 7,683,791 B2 | * | 3/2010 | Gualtieri | ...................... 340/580 |
| 2007/0046478 A1 | * | 3/2007 | Crisman | ..................... 340/580 |
| 2009/0009188 A1 | * | 1/2009 | Gualtieri | ..................... 324/633 |

* cited by examiner

*Primary Examiner*—Lisa M Caputo
*Assistant Examiner*—Punam Roy
(74) *Attorney, Agent, or Firm*—Fogg & Powers LLC

(57) ABSTRACT

An apparatus for detecting the presence of ice includes a sensory circuit including a sensor operable to be coupled to a surface exposed to moisture. The sensory circuit is operable to create an electromagnetic standing wave. A heating element is coupled to the surface and a first transmission line. A first source is coupled to the first transmission line and is operable to inject a driving signal into the first transmission line, the driving signal being operable to drive the heating element. A mixing element is coupled to the sensory circuit and first transmission line and is operable to produce a mixed signal from the driving signal and a measure of the standing wave. A comparator is operable to compare at least one characteristic of the mixed signal with reference data for determining the presence of ice contacting the sensor.

15 Claims, 2 Drawing Sheets

AIRCRAFT ICING SENSOR

BACKGROUND OF THE INVENTION

Heavy freezing drizzle can cause extensive engine damage in jets waiting for takeoff. Often, freezing drizzle can appear to be only harmless light drizzle to even trained meteorologists, with the result that preventative or remedial de-icing is not done. The National Center for Atmospheric Research reported that two cases of heavy freezing drizzle at Denver International Airport on Oct. 31, 2002, and the same date in 2003, caused a total of $2.85 million in damage to 18 jet engines on United Airlines 737 aircraft.

The accumulation of ice on airplane wings continues to be one of aviation's most insidious problems claiming lives due to take-off crashes and ice accumulation while a plane is in flight. Anti-icing solutions can be and are applied when the aircraft is on the ground but are expensive and have a negative environmental impact. Anti-icing systems used in the air consume large amounts of energy and their over-use can contribute to mechanical wear and expensive repair.

SUMMARY OF THE INVENTION

In an embodiment of the invention, an apparatus for detecting the presence of ice includes a sensory circuit including a sensor operable to be coupled to a surface exposed to moisture. The sensory circuit is operable to create an electromagnetic standing wave. A heating element is coupled to the surface and a first transmission line. A first source is coupled to the first transmission line and is operable to inject a driving signal into the first transmission line, the driving signal being operable to drive the heating element. A mixing element is coupled to the sensory circuit and first transmission line and is operable to produce a mixed signal from the driving signal and standing wave. A comparator is operable to compare at least one characteristic of the mixed signal with reference data for determining the presence of ice contacting the sensor.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
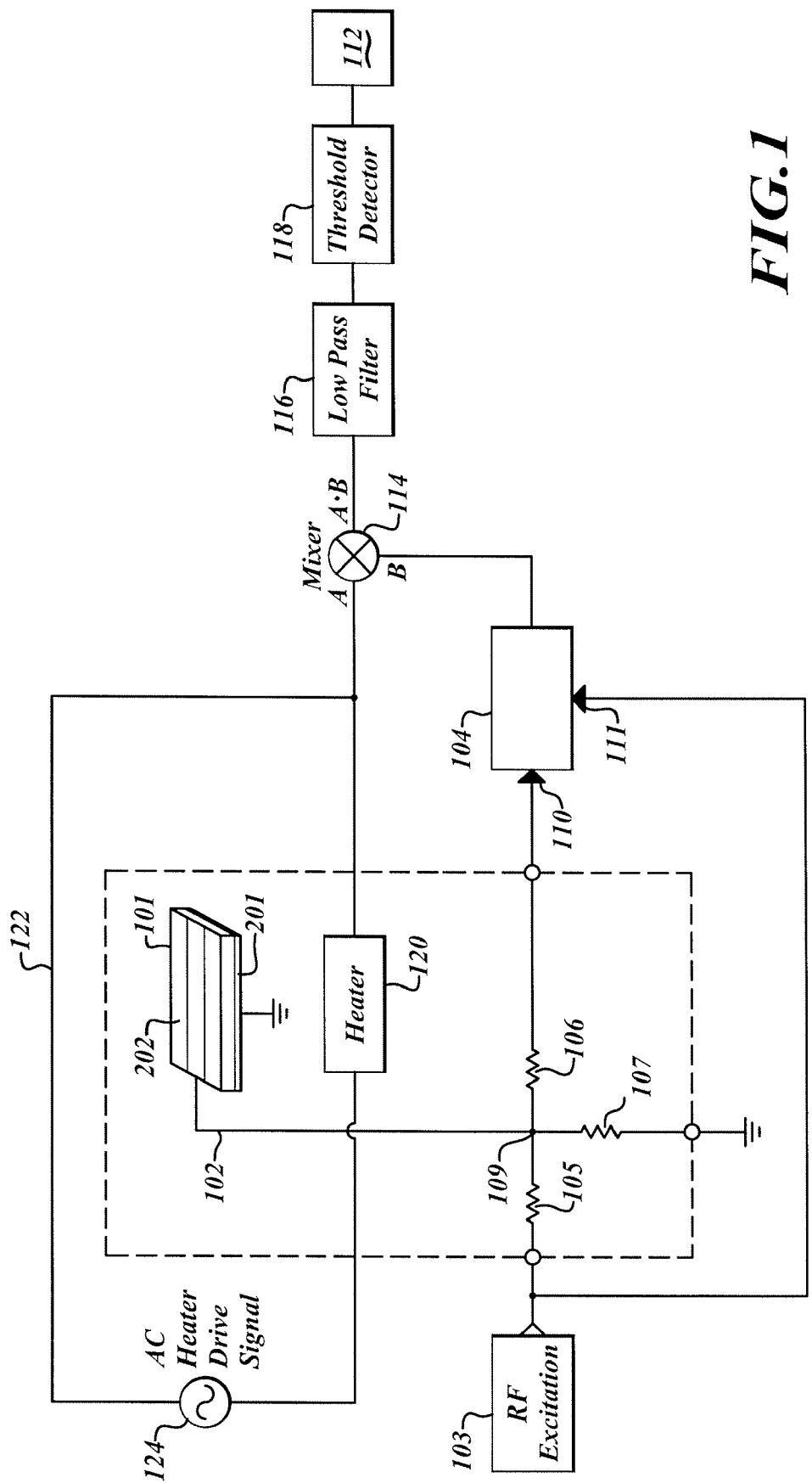
FIG. 1 is a schematic view of an apparatus according to an embodiment of the present invention.

Embodiments of the present invention may utilize components and principles described in U.S. Pat. No. 6,505,509, entitled "Apparatus and Method for Measuring the Level of a Fluid," issued Jan. 14, 2003, and U.S. patent application Ser. No. 11/832,771, entitled "Aircraft Icing Sensor" filed Aug. 2, 2007, which are hereby incorporated by reference in their entireties as if fully set forth herein.

An embodiment of the present invention collocates a heater and sensor, drives the heater with a known sinusoidal excitation and detects the sensor signal with, for example, a homodyne detection approach. This increases the sensitivity and reduces the influence of the irregular surface water or ice distribution by driving the system around the ice-liquid phase transition and demodulates the resulting sensed signal with a process that significantly enhances signal to noise characteristics.

The dielectric constant of water is known to be much larger than the dielectric constant of ice, 80 versus 3.2. An embodiment of the invention uses a surface mounted sensor that can detect changes in permittivity to sense the presence of ice. A resonant transmission line is one way to detect changes in permittivity; a set of parallel conductors separated by an insulator and operated by applying a voltage across the electrodes at one or more chosen frequencies while measuring the resultant change in amplitude and phase. Other types of resonant sensors exist such as microstrip resonators of various geometries which also can be used to measure change in the surrounding permittivity. In an embodiment, the sensor is collocated with a metal film heater driven by a slowly varying sinusoidal signal. The heater-driving signal and amplitude is designed to cause partial melting of any overburden ice that may form on the exposed sensor. The change in dielectric properties of the overburden water and or ice is detected using a homodyne detection or other frequency selective detection scheme. Very thin and small heaters may play a role in the complete sensor because the frequency response of such heaters greatly exceeds the frequency response of the water/ice phase change, and the thin heaters can facilitate collocating the dielectric sensing and heating components.

Homodyne detection is a signal-detection approach whereby the signal to be detected is mixed with a reference signal of the same frequency. This is in contrast to a heterodyne detection approach where the signal to be detected is mixed with a reference signal at a different frequency. An embodiment may include a lock-in amplifier (a.k.a. phase-sensitive detector), which is one example of a homodyne detector. A lock-in amplifier provides a DC output in proportion to the detected time-varying signal. It is, in essence, a homodyne detection approach where the reference signal used to drive the system is mixed with the signal to be detected and then passed through a low-pass filter. The output from the (multiplying) mixer is the product of the two input signals. In the case of sine-wave input signals, the product can be re-expressed using a mathematical identity as the sum of two signals with frequencies at the sum and difference frequencies of the input signals. Low-pass filtering eliminates the high frequency components of the mixer output.

In an embodiment, a slowly varying sinusoidal signal is used to drive the underlying heater in such a way as to cause at least partial melting of any ice on the exposed surface of the sensor. Because there is such a large difference in the dielectric value for water and ice, even small amounts of melting will cause significant changes in the dielectric properties of the environment detected by the sensor. The driving signal used to excite the heater is then mixed with the measured standing wave voltage signal produced by the aircraft ice sensor. When ice is present, a signal will be generated corresponding to the heater driving frequency, which will result in a DC signal proportional to the signal amplitude from which a threshold comparison can yield a determination of whether ice is present.

Specifically, FIG. 1 depicts a sensory system according to an embodiment of the present invention and configured to measure the standing wave voltage. Shown in FIG. 1 are a sensor 101 having a ground plane 201 (not shown), which is connected to ground, a cable 102 shown connected to a conductive stripline 202 of the sensor 101, a resistor "T" network (comprised of resistors 105, 106, and 107), an RF excitation source, which, in an embodiment, may be a frequency synthesizer 103, a voltage detector, which, in an embodiment, may include a voltage meter (not shown) or lock-in amplifier 104, a mixer 114, low-pass filter 116, a threshold detector 118, and a processing device, such as a computer 112. The illustrated system further includes a heating element 120 collocated with the sensor 101, a driver-signal transmission line 122, and a signal driver 124.

The frequency synthesizer 103 may be used to inject a sine or other appropriate wave into the cable 102 and the sensor 101 (the combination of which may hereinafter be referred to as the "sensing element") at the input 109 of the sensing element. The injected wave reflects back from the end of the sensing element, where the resistor "T" network adds the voltage of the injected wave to the voltage of the reflected wave, the sum of which is input into signal port 110 on the lock-in amplifier 104. The far end of the sensing element may be open, and the open end reflects the signal because of an impedance discontinuity from its nominal impedance (e.g., 50 ohms) to infinite impedance at the open end. The initial injected wave may also be sent to a reference port 111 on the lock-in amplifier 104 to serve as a calibration reference.

Additionally, and as alluded to above, a slowly varying sinusoidal signal generated by the driver 124 is used to excite the heater 120 in such a way as to cause at least partial melting of any ice that may be present on the exposed surface of the sensor 101. The driving signal used to excite the heater 120 is also mixed by the mixer 114 with the standing wave voltage signal measured by the lock-in amplifier 104 and produced by the aircraft ice sensor 101. When ice is present, a corresponding signal will be generated that follows the heater driving frequency, due to the change in sensed impedance and commensurate change in the standing wave voltage as a result of the ice changing state, (i.e., melting). The phase sensitive detection scheme results in a DC signal output by the filter 116 when the voltage standing wave signal varies with the heater drive frequency. From this DC signal, a threshold comparison may be performed by the threshold detector 118, to determine whether ice is present. This determination may be made by the computer 112, which may compare characteristics of the DC signal with reference data to determine the presence of ice contacting the sensor 101. Such reference data may include, for example, DC levels that correspond to the melting of ice on or near the sensing element.

The functionality of an embodiment may be based on a resonant transmission line. Over the correct range of frequencies, a standing-wave voltage can be measured for the sensor 101. This standing wave voltage changes due to the presence of water because the water causes the electrical length of the sensor 101 to change in response to changes in the dielectric environment detected by the sensor.

Figure 2:
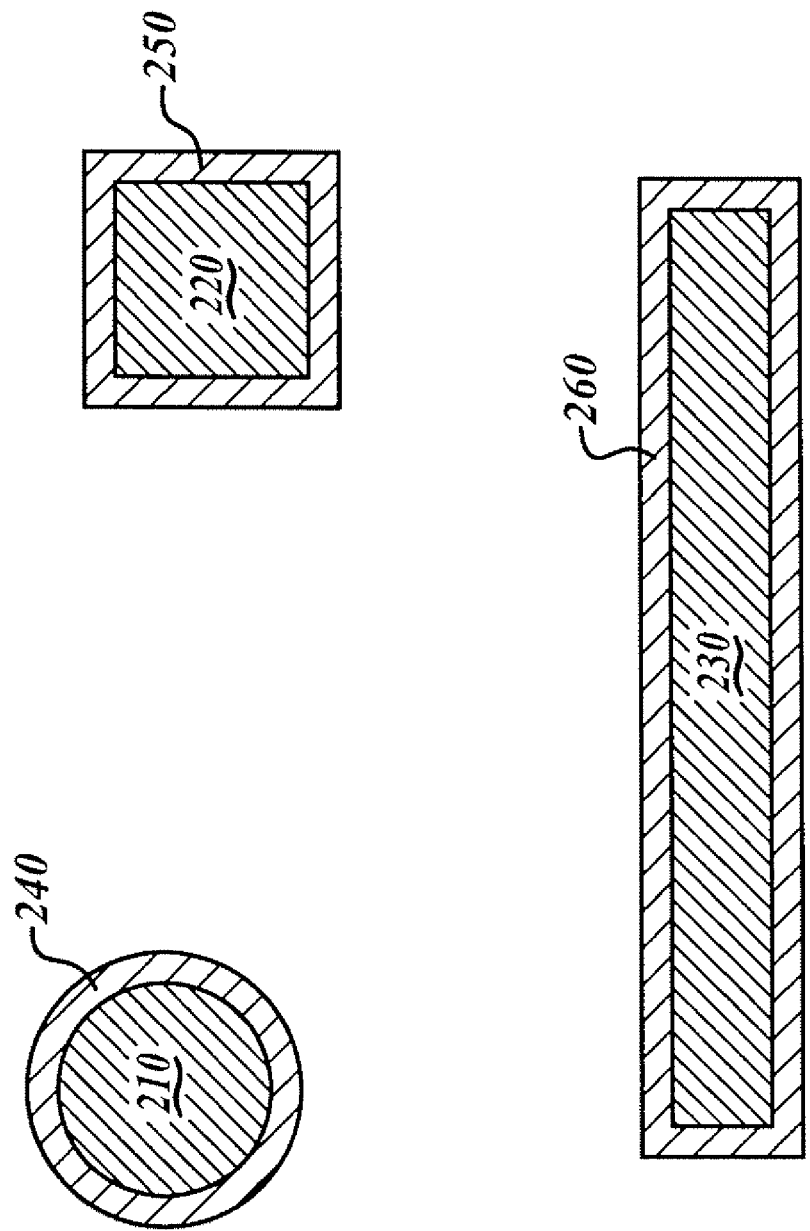
FIG. 2 is a top view of multiple types of sensor/heater assemblies implementable in one or more embodiments of the invention.

FIG. 2 illustrates a top view of alternative constructions of the sensor 101 that may be implemented in at least one embodiment of the invention. Such resonant sensors of varying geometries may include a microstrip ring resonator 210, a microstrip square-shaped resonator 220, and a strip line 230. The resonant frequency of each such resonant sensor depends on factors such as, for example, geometry, the dielectric substrate used and the conductor width. As described above herein, the heating element 120 is collocated with or located in close proximity to the sensor 101. As such, and as illustrated in FIG. 2, a heating element 240, 250, 260 is disposed underneath respective sensors 210, 220, 230. Each heater/sensor assembly may be mounted onto an exposed aircraft surface.

While a preferred embodiment of the invention has been illustrated and described, as noted above, many changes can be made without departing from the spirit and scope of the invention. For example, an embodiment of the invention includes a sensor that may be embedded into a composite wing structure. Accordingly, the scope of the invention is not limited by the disclosure of the preferred embodiment. Instead, the invention should be determined entirely by reference to the claims that follow.

The invention claimed is:

1. An apparatus for detecting the presence of ice comprising:
   a sensory circuit including a sensor operable to be coupled to a surface that is subject to moisture exposure, the sensory circuit operable to create a standing wave;
   a heating element coupled to the surface and to a first transmission line;
   a first source coupled to the first transmission line and operable to apply a driving signal to the first transmission line, the driving signal operable to drive the heating element;
   a mixing element coupled to the sensory circuit and to the first transmission line and operable to produce a mixed signal from the driving signal and the standing wave; and
   a comparator operable to compare at least one characteristic of the mixed signal with reference data for determining the presence of ice contacting the surface.

2. The apparatus of claim 1, wherein:
   the sensor comprises a second transmission line; and
   the sensory circuit further comprises:
      a second source coupled to the second transmission line and operable to inject a wave into the second transmission line, and
      a summer coupled to the second transmission line and operable to create the standing wave, the standing wave comprising the sum of the injected wave and a reflected wave reflected by the end of the second transmission line.

3. The apparatus of claim 1, further comprising a low-pass filter disposed between the mixing element and the comparator.

4. The apparatus of claim 2, wherein the summer comprises a "T" network including:
   a first resistor connected to the output of the second source;
   a second resistor connected to the mixing element; and
   a third resistor connected to a system ground, and wherein each resistor is coupled to the second transmission line.

5. The apparatus of claim 1 wherein the heating element is collocated with the sensor.

6. The apparatus of claim 2 wherein the wave is injected after raising the temperature of the heating element to a predetermined level.

7. The apparatus of claim 6 wherein the wave is injected after raising the temperature of the second transmission line to the predetermined level.

8. The apparatus of claim 1 wherein the driving signal is sinusoidal.

9. The apparatus of claim 1 wherein the frequency of the driving signal is equal to the frequency of the standing wave.

10. A method for detecting the presence of ice on a surface, the method comprising the steps of:
   coupling a sensory circuit to a portion of the surface, the sensory circuit including a sensor and being operable to create a standing wave, wherein the sensor comprises a second transmission line;
   injecting a wave into the second transmission line, wherein the standing wave comprises the sum of the injected wave and a reflected wave reflected by the end of the second transmission line;
   coupling a heating element to the surface and to a first transmission line;

introducing a driving signal into the first transmission line, the driving signal operable to drive the heating element;

producing a mixed signal from the driving signal and standing the wave; and comparing at least one characteristic of the mixed signal with reference data indicating the presence of ice.

11. The method according to claim 10, further comprising low-pass filtering the mixed signal.

12. The method of claim 10, wherein the sum is generated by a "T" network including:

a first resistor connected to a source of the injected wave;

a second resistor connected to a source of the mixed signal; and a third resistor connected to a system ground, and wherein each resistor is coupled to the second transmission line.

13. The method of claim 10, further comprising collocating the heating element and the sensor.

14. The method of claim 10 wherein the driving signal is sinusoidal.

15. The method of claim 10 wherein the frequency of the driving signal is equal to the frequency of the standing wave.

* * * * *